United States Patent
Thevasahayam

(10) Patent No.: US 9,914,647 B2
(45) Date of Patent: Mar. 13, 2018

(54) TWO-DIMENSIONAL TRANSITION METAL DICHALCOGENIDE SHEETS AND METHODS OF PREPARATION AND USE

(71) Applicant: EMPIRE TECHNOLOGY DEVELOPMENT LLC, Wilmington, DE (US)

(72) Inventor: Arockiadoss Thevasahayam, Madurai (IN)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 342 days.

(21) Appl. No.: 14/520,358

(22) Filed: Oct. 22, 2014

(65) Prior Publication Data
US 2015/0116906 A1    Apr. 30, 2015

(30) Foreign Application Priority Data
Oct. 24, 2013 (IN) ............... 4799/CHE/2013

(51) Int. Cl.
| | |
|---|---|
| *H01G 11/86* | (2013.01) |
| *C01G 39/06* | (2006.01) |
| *H01G 11/30* | (2013.01) |
| *H01G 11/24* | (2013.01) |
| *H01G 11/68* | (2013.01) |

(Continued)

(52) U.S. Cl.
CPC ............ *C01G 39/06* (2013.01); *C01B 19/007* (2013.01); *C01B 21/0768* (2013.01); *C01G 1/12* (2013.01); *H01G 11/24* (2013.01); *H01G 11/28* (2013.01); *H01G 11/30* (2013.01); *H01G 11/68* (2013.01); *H01G 11/86* (2013.01); *C01P 2002/01* (2013.01); *C01P 2002/20* (2013.01); *C01P 2004/04* (2013.01); *C01P 2004/20* (2013.01);
(Continued)

(58) Field of Classification Search
CPC ........ H01G 11/00; H01G 11/32; H01G 11/04; H01G 11/68; C01G 39/06; C01G 1/12; C01B 21/007; C01B 21/0768; Y02E 60/13
See application file for complete search history.

(56) References Cited

U.S. PATENT DOCUMENTS

| | | |
|---|---|---|
| 2007/0272902 A1 | 11/2007 | Evans et al. |
| 2012/0034442 A1 | 2/2012 | Pauzauskie et al. |

(Continued)

FOREIGN PATENT DOCUMENTS

| | | |
|---|---|---|
| WO | 2012028724 A1 | 3/2012 |
| WO | 2012101457 A1 | 8/2012 |

OTHER PUBLICATIONS

"Silica Aerogels", Retrieved from the <URL: https://web.archive.org/web/20140821112836/http://www.sps.aero/Key_ComSpace_Articles/TSA-009_White_Paper_Silica_Aerogels.pdf> on Aug. 21, 2014, pp. 1-41.

(Continued)

*Primary Examiner* — Nguyen Ha
(74) *Attorney, Agent, or Firm* — Turk IP Law, LLC

(57) ABSTRACT

Methods of forming two-dimensional transition metal dichalcogenide sheets are provided. The methods include adding a cross-linking agent to an activating agent to form a solution and mixing a two-dimensional transition metal dichalcogenide with the solution to form a mixture. The methods also include adding a cleaving agent to the mixture to form one or more contiguous sheets of transition metal dichalcogenide.

12 Claims, 8 Drawing Sheets

(51) Int. Cl.
*C01B 21/076* (2006.01)
*C01B 19/00* (2006.01)
*C01G 1/12* (2006.01)
*H01G 11/28* (2013.01)

(52) U.S. Cl.
CPC ...... *C01P 2004/24* (2013.01); *C01P 2006/40* (2013.01); *Y02E 60/13* (2013.01)

(56) References Cited

U.S. PATENT DOCUMENTS

| | | | |
|---|---|---|---|
| 2012/0073957 A1* | 3/2012 | Dahmani | C23C 14/0623 204/192.1 |
| 2012/0208002 A1 | 8/2012 | Todd et al. | |
| 2013/0202890 A1* | 8/2013 | Kong | H01B 1/02 428/402 |
| 2015/0118467 A1* | 4/2015 | Thevasahayam | C01B 21/0768 428/219 |

OTHER PUBLICATIONS

"Silicon Rival MoS2 Promises Small, Low-Energy Chips", BBC News Technology, Dec. 5, 2011 Last Updated at 17:19, Retrieved from the <URL: https://web.archive.org/web/20120307141610/http://www.bbc.co.uk/news/technology-16034693?> on Aug. 22, 2014, pp. 1-3.

Andres Castellanos-Gomez et al., "Mechanical Properties of Freely Suspended Semiconducting Graphene-Like Layers Based on MoS2", Nanoscale Research Letters, 2012, pp. 1-7, vol. 7, No. 233.

David L Chandler, "One-Molecule-Thick Material Has Big Advantages", Aug. 23, 2012, Retrieved from the <URL: http://newsoffice.mit.edu/2012/graphene-molybdenum-disulfide-flat-materials-0823> on Aug. 21, 2014, pp. 1-3.

Maher F. El-Kady et al., "LASER Scribing of High Performance and Flexible Graphene-Based Electrochemical Capicitors", Mar. 16, 2012, pp. 1326-1330, vol. 335.

B. Radisavljevic et al., "Single-Layer MoS2 Transistors", Nature Nanotech, Mar. 2011, pp. 147-150, vol. 6.

Yi-Hsien Lee et al., "Synthesis of Large-Area MoS2 Atomic Layers with Chemical Vapor Deposition", 2012, pp. 2320-2325, vol. 24, Issue 17.

S. J. Mei, "Molybdenum Sulfide as Electrochemical Supercapacitors", in Structure-Property Relationships of Inorganic Semiconductor Materials, Chapter 4, 2007, pp. 97-151.

Son Truong Nguyen et al., "Morphology Control and Thermal Stability of Binderless-Graphene Aerogels from Graphite for Energy Storage Applications", Colloids and Surfaces A: Physicochemical and Engineering Aspects, 2012, pp. 352-358, vol. 414.

Han Wang et al., "Integrated Circuits Based on Bilayer MoS2 Transistors", Nano Letters, 2012, pp. 4674-4680, vol. 12, No. 9, American Chemical Society.

Jian Wang et al., "Graphene Aerogels", ECS Transactions, 2009, pp. 241-247, vol. 19, No. 5.

Justin Wade Williamson, "Characterizing Cigarette Lighter Flames to Reduce Unwanted Ignition", Thesis submitted to the Faculty of the Graduate School of the University of Maryland, 2003, pp. 1-93.

Jung Joon Yoo et al., "Ultrathin Planar Graphene Supercapacitors", Nano Letters, 2011, pp. 1423-1427, vol. 11, No. 4, American Chemical Society.

* cited by examiner

TWO-DIMENSIONAL TRANSITION METAL DICHALCOGENIDE SHEETS AND METHODS OF PREPARATION AND USE

CROSS-REFERENCE TO RELATED APPLICATIONS

This application claims priority to Indian Patent Application No. 4799/CHE/2013, filed on Oct. 24, 2013, and entitled "Two-Dimensional Transition Metal Dichalcogenide Sheets and Methods of Preparation and Use" (the "First Indian Patent Application"). The First Indian Patent Application, including any appendices or attachments thereof, is incorporated by reference herein in its entirety.

This application is also related to U.S. patent application Ser. No. 14/522,577, entitled "Transition Metal Dichalcogenide Aerogels and Methods of Preparation and Use." This related application claims priority to Indian Patent Application No. 4797/CHE/2013, filed on Oct. 24, 2013, and entitled "Transition Metal Dichalcogenide Aerogels and Methods of Preparation and Use" (the "Second Indian Patent Application"). Both the related application and the Second Indian Patent Application, including any appendices or attachments thereof, are incorporated by reference herein in their entireties.

BACKGROUND

Two-dimensional materials such as metal chalcogenides (for example, transition metal dichalcogenides) and metal oxides (for example, transition metal oxides) are used in the form of large area sheets in a variety of electronic devices owing to their electrical and optical properties. Some conventional techniques to form such large sheets include chemical vapor deposition (CVD) and/or mechanical cleaving to separate metal chalcogenide sheets from the crystals. The CVD techniques require processing at high temperatures (greater than about 600° C.) and substrates such as graphite oxide and silicon to obtain large area sheets. Many of these techniques are tedious, time consuming and are substantially expensive.

SUMMARY

The foregoing summary is illustrative only and is not intended to be in any way limiting. In addition to the illustrative aspects, embodiments, and features described above, further aspects, embodiments, and features will become apparent by reference to the drawings and the following detailed description.

Briefly, in accordance with one aspect, a method of forming two-dimensional transition metal dichalcogenide sheets is provided. The method includes adding a cross-linking agent to an activating agent to form a solution and mixing a two-dimensional transition metal dichalcogenide with the solution to form a mixture. The method also includes adding a cleaving agent to the mixture to form one or more contiguous sheets of transition metal dichalcogenide.

In accordance with another aspect, a device including one or more molybdenum disulphide ($MoS_2$) sheets is provided. Each of the one or more $MoS_2$ sheets has an area of 1 $cm^2$ to about 25 $cm^2$.

In accordance with another aspect, a supercapacitor is provided. The supercapacitor includes a first electrode and a second electrode. The first electrode and the second electrode are formed of molybdenum disulphide ($MoS_2$) sheets. The supercapacitor also includes a dielectric layer disposed between the first electrode and the second electrode.

DETAILED DESCRIPTION

Figure 1:
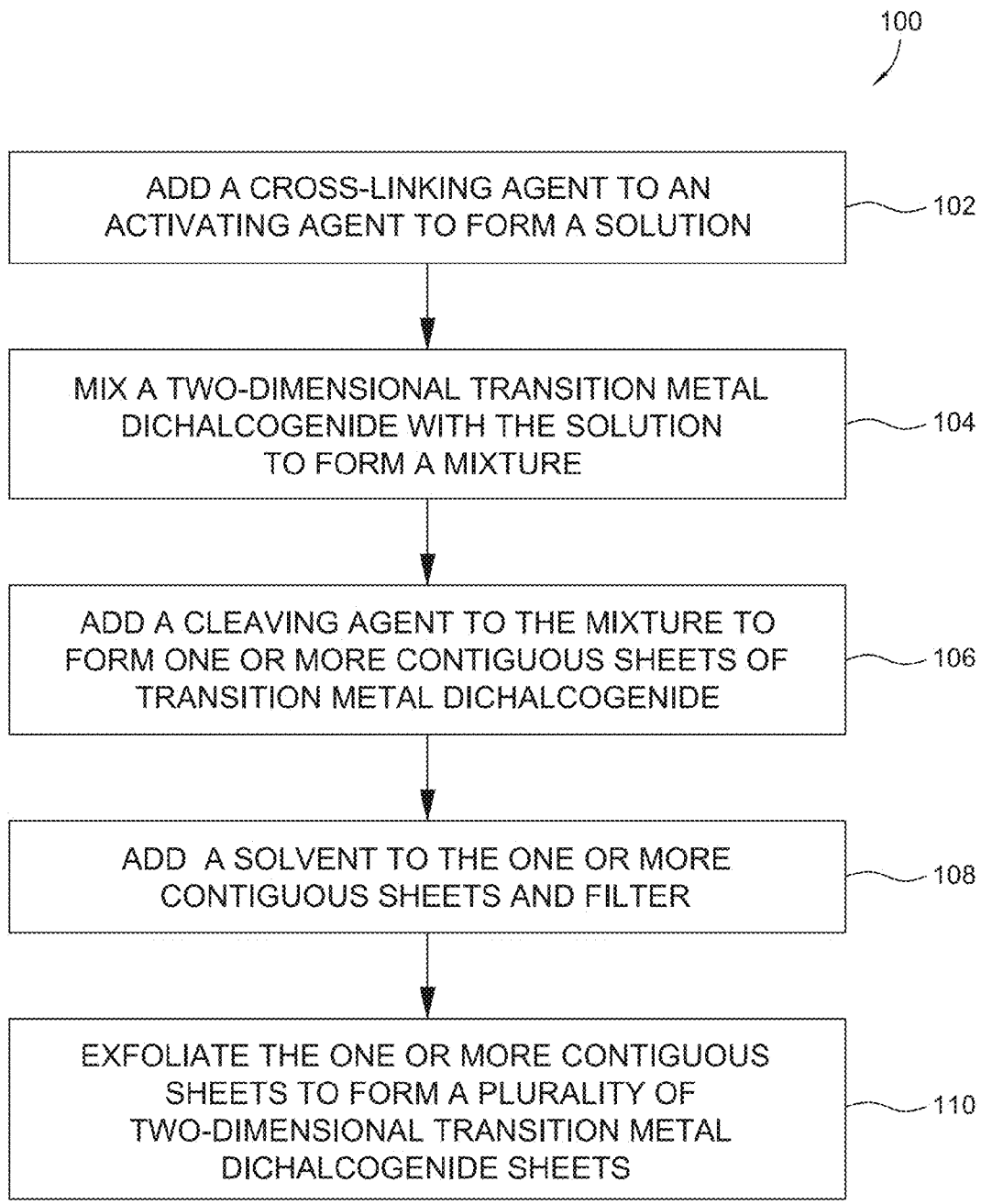
FIG. 1 is an example flow diagram of an embodiment for a method of forming two-dimensional transition metal dichalcogenide sheets.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

It will also be understood that any compound, material or substance which is expressly or implicitly disclosed in the specification and/or recited in a claim as belonging to a group or structurally, compositionally and/or functionally related compounds, materials or substances, includes individual representatives of the group and all combinations thereof. While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

Some embodiments are generally directed to techniques of forming two dimensional transition metal dichalcogenide sheets such as molybdenum disulphide ($MoS_2$) sheets that may be used in a variety of electronic and optoelectronic devices such as field-effect transistors, sensors and photodetectors. The technique provides a simple and scalable process for forming two-dimensional semiconducting transition metal dichalcogenide sheets with relatively high yield thereby enabling scalability for industrial and other applications.

Referring now to FIG. 1, an example flow diagram 100 of an embodiment for a method of forming two-dimensional transition metal dichalcogenide sheets is provided. At block 102, a cross linking agent is added to an activating agent to form a solution. Examples of the cross-linking agent include but are not limited to, 1-ethyl-3-[3-dimethylaminopropyl] carbodiimide hydrochloride (EDC), cystamine ($C_4H_{12}N_2S_2$.2HCl), N,N'-dicyclohexylcarbodiimide (DCC), 3,3'-dithiobis(sulfosuccinimidylpropionate) (DTSSP), tris (2-carboxyethyl)phosphine hydrochloride (TCEP-HCl), dithiothreitol (DTT), or combinations thereof. In one embodiment, the cross-linking agent is mixed with distilled water to form a solution prior to adding the activating agent. In one example, a concentration of the cross-linking agent is about 33.3 millimoles (mmol) to about 66.6 mmol dissolved in about 1 milliliter (ml) of water. Specific examples of the concentration of the cross-linking agent include about 33.3 mmol, about 44.4 mmol, about 55.5 mmol, about 66.6 mmol and ranges between any two of these values (including endpoints).

Examples of the activating agent include, but are not limited to ammonia ($NH_3$), tetramethyl ammonium hydroxide ($Me_4NOH$; TMAH), or combinations thereof. In one example embodiment, the pH of the activating agent is maintained at about 6.8 to about 7.1. Specific examples of the pH value include about 6.8, about 6.9, about 7.0, about 7.1 and ranges between any two of these values (including endpoints).

At block 104, a two-dimensional transition metal dichalcogenide is mixed with the above-prepared solution to form a mixture. Examples of the two-dimensional transition metal dichalcogenide include, but are not limited to, molybdenum disulphide ($MoS_2$), tungsten disulphide ($WS_2$), titanium disulphide ($TiS_2$), tantalum (IV) sulphide ($TaS_2$), zirconium disulphide ($ZrS_2$), bismuth telluride ($Bi_2Te_3$), bismuth selenide ($Bi_2Se_3$), titanium nitride chloride (TiNCl), antimony telluride ($Sb_2Te_3$), melonite ($NiTe_2$), or combinations thereof. In some examples, the two-dimensional transition metal dichalcogenide sheets comprise $MX_2$, where M is Mo, W, Bi, Sb, Ti, Pt, Nb, Ta, Ni, Zr, Hf, V, Ta, Pd, and X is S, Se, Te, NCl. In one example embodiment, mass of the two-dimensional transition metal dichalcogenide is about 50 milligrams (mg) to about 5 grams (g). Specific examples of the concentration of the mass of the two-dimensional transition metal dichalcogenide include about 50 mg, about 250 mg, about 500 mg, about 750 mg, about 1 g, about 2.5 g, about 5 g, and ranges between any two of these values (including endpoints).

At block 106, a cleaving agent is added to the mixture to form one or more contiguous sheets of transition metal dichalcogenide. Examples of the cleaving agent include, but are not limited to, N-hydroxysuccinimide (NHS), N-hydroxysulfosuccinimide (Sulfo-NHS), or combinations thereof. The cleaving agent is mixed with distilled water prior to adding the cleaving agent to the mixture. In one example, a concentration of the cleaving agent is about 33.3 millimoles (mmol) to about 66.6 mmol dissolved in about 1 ml of water. Specific examples of the concentration of the cleaving agent include about 33.3 mmol, about 44.4 mmol, about 55.5 mmol, about 66.6 mmol and ranges between any two of these values (including endpoints).

In this embodiment, the solution formed by adding the cleaving agent to the mixture is stirred continuously and is ultra-centrifuged to remove particulate matter such as unwanted chemicals and residues. In one example embodiment the solution is stirred at a temperature of about 125° C. to about 200° C. Specific examples of the temperature include about 125° C., about 135° C., about 145° C., about 155° C., about 165° C., about 175° C., about 185° C., about 195° C., about 200° C. and ranges between any two of these values (including endpoints).

In this embodiment, the cross-linking agent such as EDC functions as a linker between chalcogen ions (such as sulphur to sulphur bond of $MoS_2$) of the two-dimensional transition metal dichalcogenide. Moreover, the cleaving agent such as NHS cleaves the bond between chalcogen ions (e.g., sulphur) and the cross-linking agent thereby combining the two sulphurs.

At block 108, a solvent is added to the one or more contiguous sheets and the mixture is subsequently sonicated to remove unreacted agents. Examples of solvent include, but are not limited to, ethanol, methanol and isopropyl alcohol or combinations thereof. In one example, a concentration of the solvent is about 50 milliliters (ml) to about 75 ml. Specific examples of the concentration of the solvent include about 50 ml, about 60 ml, about 70 ml, about 75 ml, and ranges between any two of these values (including endpoints). In one embodiment, the mixture is sonicated for about 10 minutes to about 30 minutes. Specific examples of the sonication time include about 10 minutes, about 15 minutes, about 20 minutes, about 25 minutes, about 30 minutes, and ranges between any two of these values (including endpoints). The mixture is then filtered to form multi-layered contiguous sheets of transition metal dichalcogenide. In one example, the mixture is filtered through a PVDF membrane having a pore size of about 0.2 microns.

At block 110, the one or more contiguous sheets are exfoliated to form a plurality of two-dimensional transition metal dichalcogenide sheets. In one embodiment, the one or more contiguous sheets of transition metal dichalcogenide are exposed to electromagnetic radiation to form the plurality of two-dimensional transition metal dichalcogenide sheets. Examples of the electromagnetic radiation include, but are not limited to, thermal radiation, solar radiation, microwave radiation, or combinations thereof. In one example embodiment, the one or more contiguous sheets of transition metal dichalcogenide are heated to a temperature of about 125° C. to about 175° C. at a pressure of about 1 atmosphere (atm) to 2 atm. Specific examples of the temperature include about 125° C., about 135° C., about 145° C., about 155° C., about 165° C., about 175° C., and ranges between any two of these values (including endpoints). Specific examples of the pressure include about 1 atm, about 1.2 atm, about 1.4 atm, about 1.6 atm, about 1.8 atm, about 2.0 atm and ranges between any two of these values (including endpoints).

In this embodiment, the one or more contiguous sheets are exfoliated at least in part due to substantially weak Van der Waals interactions between the layers. The solvent dispersed within the multi-layered stack of the transition metal dichalcogenide sheets is evaporated as the stack is exposed to electromagnetic radiation thereby exfoliating thin two-dimensional transition metal dichalcogenide sheets.

In one example, $MoS_2$ sheets are formed using the process of FIG. 1. A multi-layered stack of $MoS_2$ sheets is formed by contacting amorphous $MoS_2$ with a solution of EDC, $NH_3$ and NHS. The multi-layered stack is then thermally exfoliated to form the $MoS_2$ sheets. In some examples, an area of the $MoS_2$ sheets is about 1 $cm^2$ to 25 $cm^2$. In some other examples, a thickness of the $MoS_2$ sheets is about 50 nanometers to about 100 microns. Specific examples of the thickness include about 0.05 microns, about 0.1 microns, about 1 micron, about 10 microns, about 50 microns, about 100 microns and ranges between any two of these values (including endpoints).

In some examples, a capacitance of the $MoS_2$ sheets is about 1 nanofarad (nF) to about 100 nF. Specific examples of the capacitance include about 1 nF, about 10 nF, about 30 nF, about 50 nF, about 70 nF, about 90 nF, about 100 nF and ranges between any two of these values (including endpoints). A device including one or more two-dimensional transition metal dichalcogenide sheets maybe formed. Examples of the device include, but are not limited to, field-effect transistors, electrodes, sensors, photodetectors, capacitors, solar cells, light emitting diodes, thermoelectric devices, or combinations thereof. In one example, the device is a Schottky photodiode.

Figure 2:
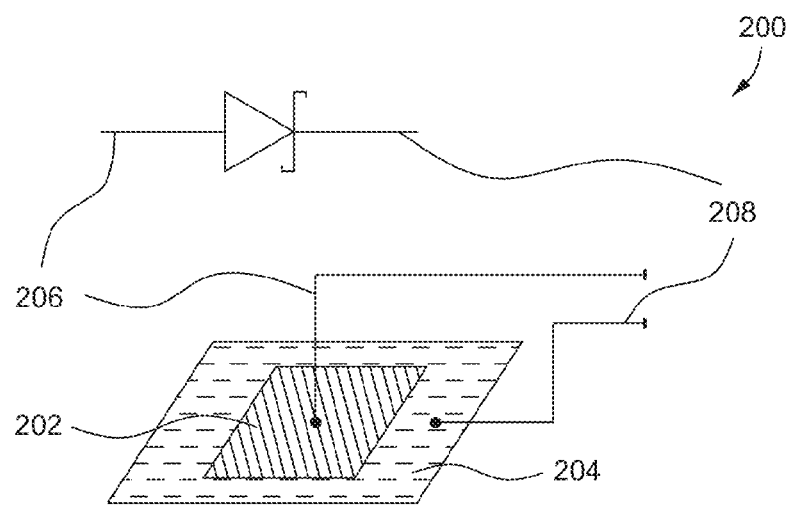
FIG. 2 illustrates an example Schottky photodiode with one or more $MoS_2$ sheets.

FIG. 2 illustrates an example Schottky photodiode 200 formed using one or more $MoS_2$ sheets 202. In this embodiment, the one or more $MoS_2$ sheets 202 are formed using the example process of FIG. 1. In one example, the $MoS_2$ sheets 202 are formed by thermally exfoliating a multi-layered stack of $(MoS_2)$ sheets that is formed by reacting amorphous $MoS_2$ with a solution of 1-ethyl-3-[3-dimethylaminopropyl] carbodiimide hydrochloride (EDC), ammonia ($NH_3$), and N-hydroxysuccinimide (NHS). The $MoS_2$ sheets 202 are disposed on a conducting polymer substrate 204 such as fluorine-doped tin oxide (FTO) coated glass. The electrical contacts with $MoS_2$ sheets 202 are tapped using a silver paste. In this embodiment, the anode and cathode electrodes of the Schottky photodiode 200 are represented by reference numerals 206 and 208 respectively.

The photodiode 200 can generally include any number of $MoS_2$ sheets. In one example, the number of $MoS_2$ sheets 202 used in the photodiode 200 is about 10 to about 15. In certain embodiments, the thickness of the $MoS_2$ sheets 202 is about 50 nm to 100 microns. Specific examples of the thickness include about 50 nm, about 0.1 microns, about 1 micron, about 10 microns, about 50 microns, about 100 microns and ranges between any two of these values (including endpoints). In some examples, the capacitance of the $MoS_2$ sheets 202 is about 1 nF to about 100 nF. Specific examples of capacitance include about 1 nF, about 20 nF, about 40 nF, about 60 nF, about 80 nF, about 100 nF, and ranges between any two of these values (including endpoints). In some examples, a bandgap of the $MoS_2$ sheets 202 is about 1.5 electronvolt (eV) to 2 electronvolts. Specific examples of the bandgap include about 1.5 eV, about 1.6 eV, about 1.7 eV, about 1.8 eV, about 1.9 eV, about 2 eV, and ranges between any two of these values (including endpoints). It should be noted that the $MoS_2$ sheets are n-type semiconducting material, and are used in the Schottky photodiode described above. By using suitable p-type materials, other diode structures may be fabricated.

Figure 3:
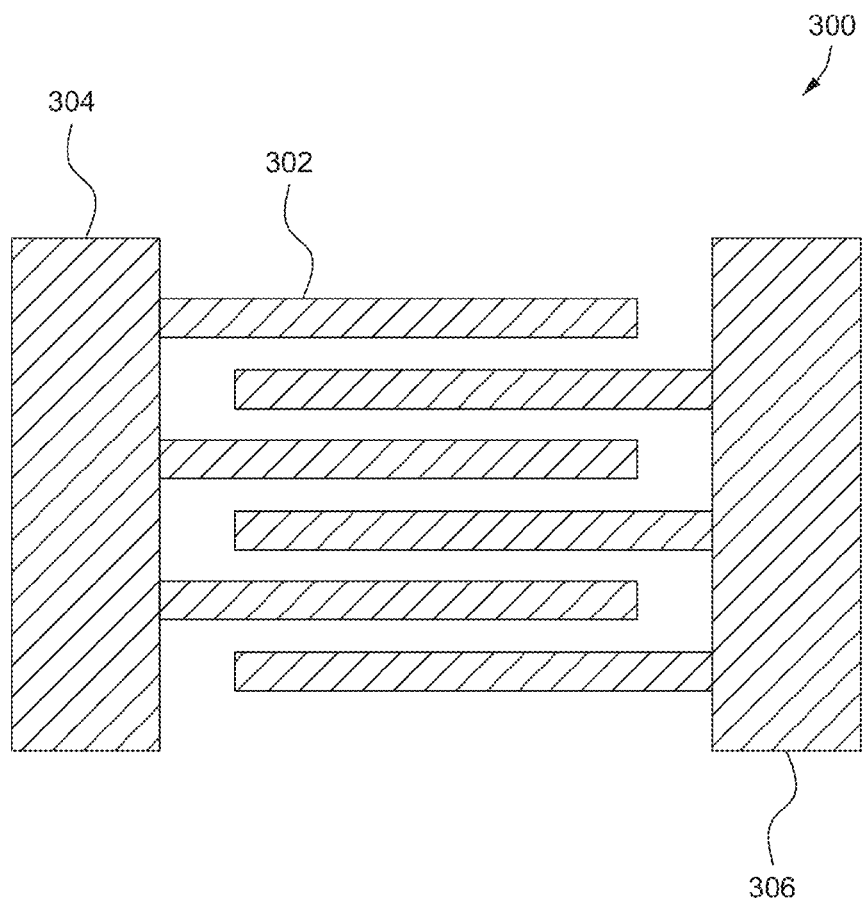
FIG. 3 is an example configuration of a multi-fingered Schottky diode formed using $MoS_2$ sheets.

Referring now to FIG. 3, an example configuration of a multi-fingered Schottky diode 300 formed using $MoS_2$ sheets is illustrated. In the illustrated embodiment, $MoS_2$ sheets having substantially large surface area formed using the present technique are used for fabricating large area multi-fingered Schottky photodiode 300. The multi-fingered Schottky diode 300 includes multiple fingers generally represented by reference numeral 302 that are serially located between a first terminal 304 and a second terminal 306. The device 300 formed using the $MoS_2$ sheets has substantially reduced leakage current and breakdown voltage.

Figure 4:
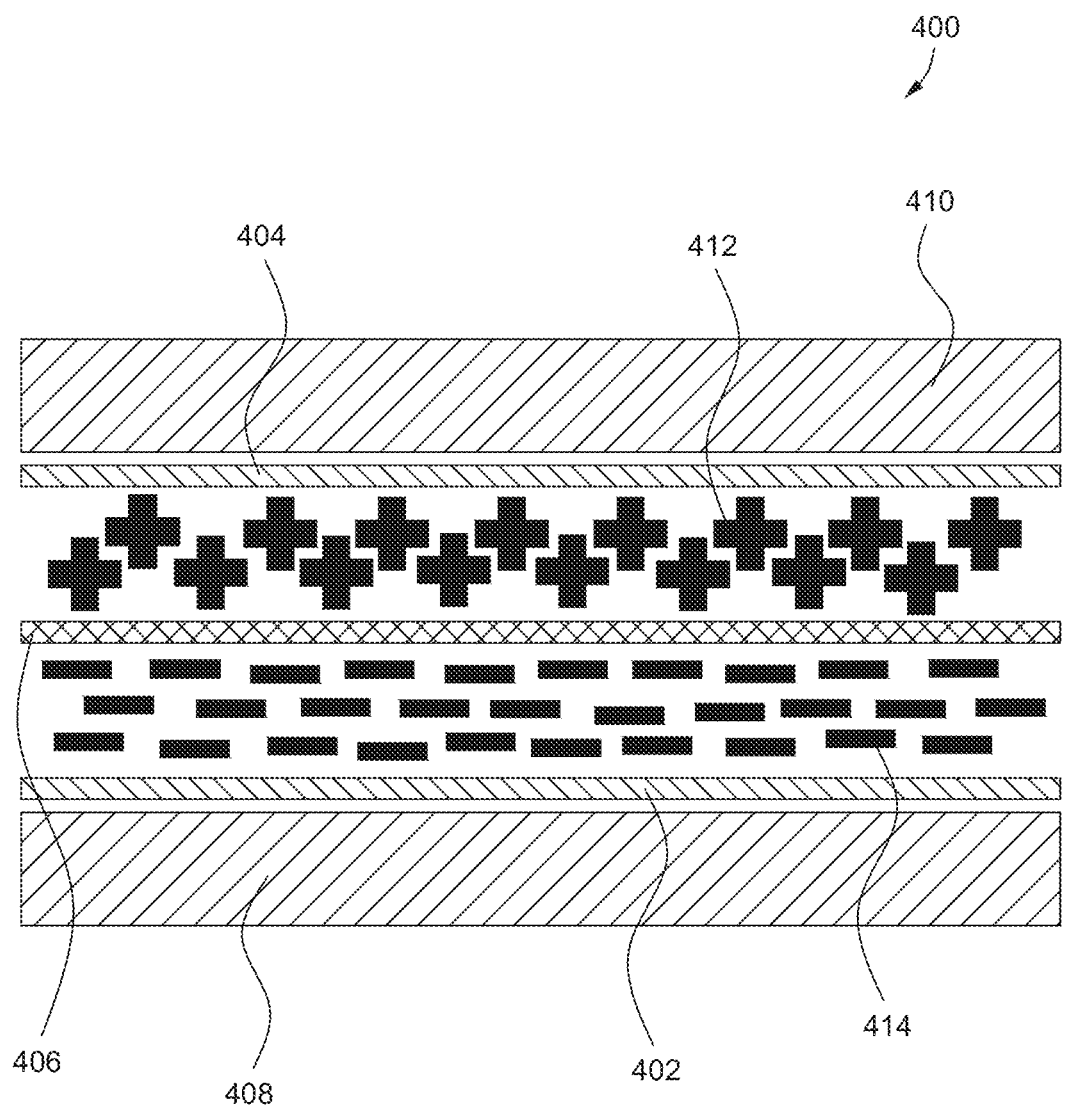
FIG. 4 is an example configuration of a supercapacitor.

In another example, a supercapacitor is fabricated using the two-dimensional transition metal dichalcogenide sheets formed using proposed technique. FIG. 4 illustrates an example configuration 400 of a supercapacitor. The supercapacitor 400 has a two electrode cell configuration that includes a first electrode 402 and a second electrode 404 that are separated by a dielectric layer 406. In one example, the first electrode 402 and the second electrode 404 are formed using $MoS_2$ sheets having substantially large surface area such as formed using the example process of FIG. 1.

In some examples, an area of the $MoS_2$ sheets is about 1 $cm^2$ to about 25 $cm^2$. Specific examples of the area include about 1 $cm^2$, about 5 $cm^2$, about 10 $cm^2$, about 15 $cm^2$, about 20 $cm^2$, about 25 $cm^2$, and ranges between any two of these values (including endpoints). In some other examples, a thickness of the $MoS_2$ sheets is about 50 nanometers to about 100 microns. Specific examples of the thickness include about 0.05 microns, about 0.1 microns, about 1 micron, about 10 microns, about 50 microns, about 100 microns and ranges between any two of these values (including endpoints).

In this embodiment, $MoS_2$ sheets can be directly used as electrochemical capacitor electrodes without the need of additional binders or conductive additives. In one example embodiment, the dielectric layer 406 includes polyvinyl alcohol (PVA). However, other suitable materials such as nafion, collagen, poly methyl methacralate (PMMA) and proton exchange membrane (PEM) may be used for the dielectric layer 406 membrane.

In another example embodiment, PVA in combination with dipotassium phosphate ($K_2HPO_4$) solution is used for the dielectric layer 406 where $K_2HPO_4$ functions as an electrolyte. The supercapacitor 400 also includes current collectors generally represented by reference numerals 408 and 410. The current collectors 408 and 410 can be formed of a conducting material such as aluminum (Al), copper (Cu), zinc oxide (ZnO), fluorine-doped tin oxide (FTO), indium tin oxide (ITO), or combinations thereof. In one example, the current collectors 408 and 410 are formed of a carbon cloth. In another example embodiment, carbon cloth can be replaced with $MoS_2$ layers itself as current collectors that may improve power and energy density of the supercapacitor 400.

In operation, as the supercapacitor 400 is charged, anions and cations generally represented by reference numerals 412 and 414 respectively of the electrolyte accumulate proximate the respective surface of the $MoS_2$ electrodes 402 and 404. Here, the ions 412 and 414 are electrically isolated from the material by the electrochemical double layer that is serving as a dielectric.

In certain embodiments, supercapacitor devices having multiple alternate layers of $MoS_2$ and the dielectric material are formed. A variety of dielectric materials and electrolytes may be used in such device to enhance energy and power density of such devices. Examples of electrolytes include, but are not limited to, hyperhalogenes based electrolytes, lithium based electrolytes, lithium carbonate, ethylene carbonate, potassium hydroxide, or combinations thereof. The flexible energy storage devices such as the supercapacitor 400 have reduced structural weight and can be easily integrated with other flexible electronics. In certain embodiments, a specific capacitance of the supercapacitor using $MoS_2$ based electrodes is about 20 Farad/gram (F/gm) to about 50 F/gm. In certain embodiments, an energy density of the supercapacitor using $MoS_2$ based electrodes is about 150 Watt hour/kilogram (Wh/kg) to about 500 Wh/kg. In certain embodiments, a power density of the supercapacitor using $MoS_2$ based electrodes is about 200 Watt/kilogram (W/kg) to about 900 W/kg.

EXAMPLES

The present invention will be described below in further detail with examples and comparative examples thereof, but it is noted that the present invention is by no means intended to be limited to these examples.

Example 1: Formation of MoS$_2$ Sheets

The MoS$_2$ sheets were formed using the example method of FIG. 1. A biochemical buffer with about 50 ml of ammonia solution (obtained from Molychem Pvt. Ltd., India) was prepared and the pH of the biochemical buffer was adjusted to be about 6.9. Further, about 50 millimole of 1-ethyl-3-(3-dimethylaminopropyl) carbodimide hydrochloride (EDC) (obtained from Sigma-Aldrich, India) was dissolved in about 1 ml of milli Q water. The above solutions were mixed and about 50 mg of amorphous molybdenum disulphide (obtained from Molychem Pvt. Ltd., India) was added and the mixture was stirred for about 10 minutes at room temperature.

Further, a solution of 33.3 mmol of N-hydroxysuccinimide dissolved in about 1 ml of Q water was added to the above mixture. This solution was subsequently stirred for 6 hours at a temperature of about 150° C. Here, EDC acted as a linker between sulphur to sulphur atoms of MoS$_2$ whereas NHS acted as a cleaving agent and cleaved the bond between sulphur and EDC, thereby combining the two sulphurs. The above solution was washed with milli Q water and was ultra-centrifuged to remove unwanted chemicals and residues. Next, about 50 ml of ethanol was added and the solution was sonicated for about 10 minutes and filtered through polyvinylidene difluoride (PVDF) membrane having a pore size of about 0.2 microns. The membrane was removed and the filtrate was heated at a temperature of about 50° C. for about 10 minutes to separate the MoS$_2$ multilayered stack from the PVDF membrane.

Example 2: Characterization of the MoS$_2$ Sheets

The multi-layered MoS$_2$ sheets of Example 1 were characterized using a colorimeter for sulphide-sulphide bond continuity. Here, colorimetric assay using reagent 2-nitro-5-thiosulfobenzoate was used for determination of disulfide bond. The color of the formed crystal was observed to be light green, which indicated that the bonds were continuous. The multi-layered MoS$_2$ stack had a continuous surface that indicated that the sheets were continuous. The thickness of the multi-layered MoS$_2$ sheets was measured to be about 3.5 microns.

Example 3: Exfoliation of MoS$_2$ Sheets

Figure 5:
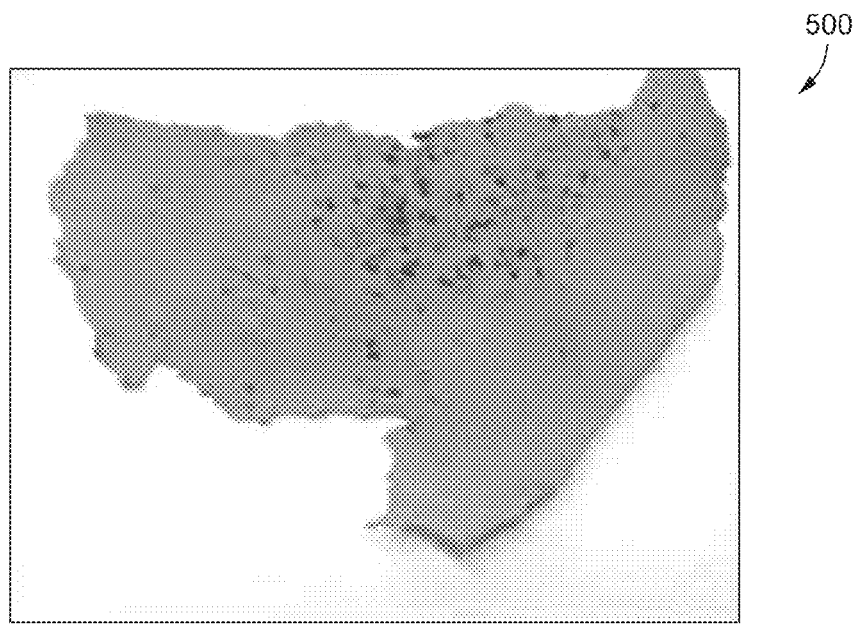
FIG. 5 is an example image of exfoliated $MoS_2$ sheets.

The multi-layered MoS$_2$ stacked sheets of Example 1 were thermally exfoliated using thermal radiation to obtain molybdenum disulphide (MoS$_2$) sheets. FIG. 5 is an example image 500 of the exfoliated MoS$_2$ sheets. The multi-layered MoS$_2$ sheets were transferred to a stainless steel vessel and were induction heated to a temperature of about 50° C. containing air at about 1 atm pressure for about 10 minutes to about 15 minutes. Subsequently the temperature was raised to about 150° C. and was maintained at about 150° C. for a time period of about 5 minutes to about 6 minutes. Here, ethanol dispersed within the MoS$_2$ multilayered stacks was evaporated due to the induction heat and resulted in exfoliation of MoS$_2$ multi-layered stacks to thin MoS$_2$ sheets having a thickness of about 3.5 microns.

Example 4: Characterization of the Exfoliated MoS$_2$ Sheets

Figure 6:
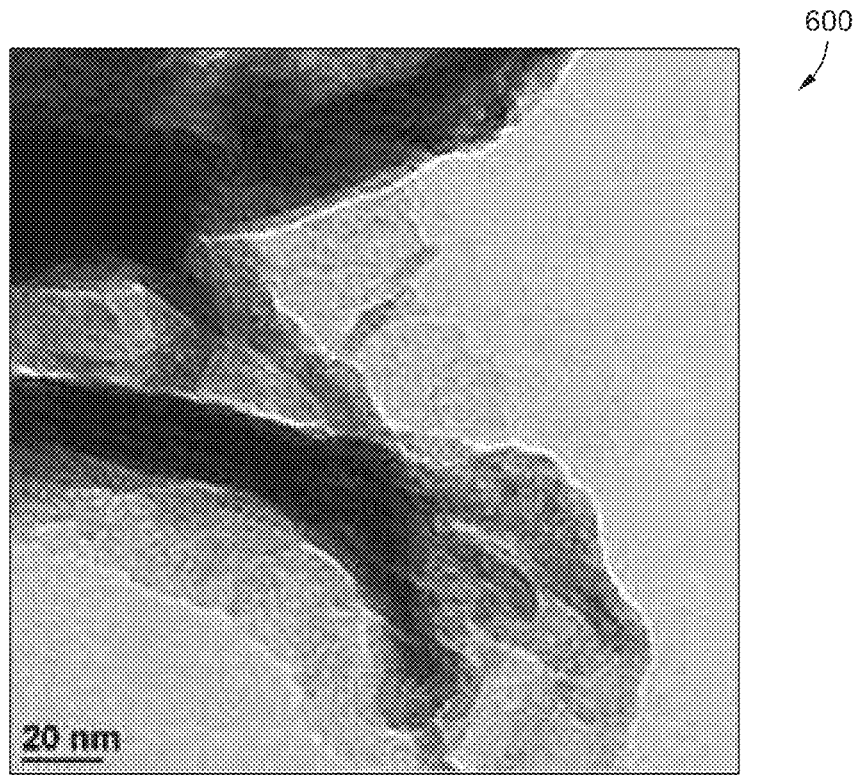
FIG. 6 is an example transmission electron microscopy (TEM) image of an exfoliated $MoS_2$ sheet.

FIG. 6 is an example transmission electron microscopy (TEM) image 600 of an exfoliated MoS$_2$ sheet. The exfoliated MoS$_2$ sheet was observed to be transparent. Here, the electrical resistivity of the sample was measured using the standard four probe technique and was estimated to be about 222.5 ohm centimeters ($\Omega$cm). Further, the specific capacitance of the sample was measured to be about 1.29 nano Farad (nF).

Example 5: Fabrication of a Transparent Schotkky Photodiode Using Exfoliated MoS$_2$ Sheets of Example 3

A Schotkky photodiode was fabricated using exfoliated MoS$_2$ sheets of Example 3. Here, exfoliated MoS$_2$ sheets were dispersed in ethanol, and were sprayed on fluorine doped tin oxide (FTO) glass plate and subsequently a photodiode was fabricated. Transmission electron microscopy observations of the sample indicated that there were about 10 to 15 layers of MoS$_2$. Electrical contacts with MoS$_2$ sheets were tapped using a silver paint.

Example 6: Characterization of the Schottky Photodiode of Example 5

Figure 7:
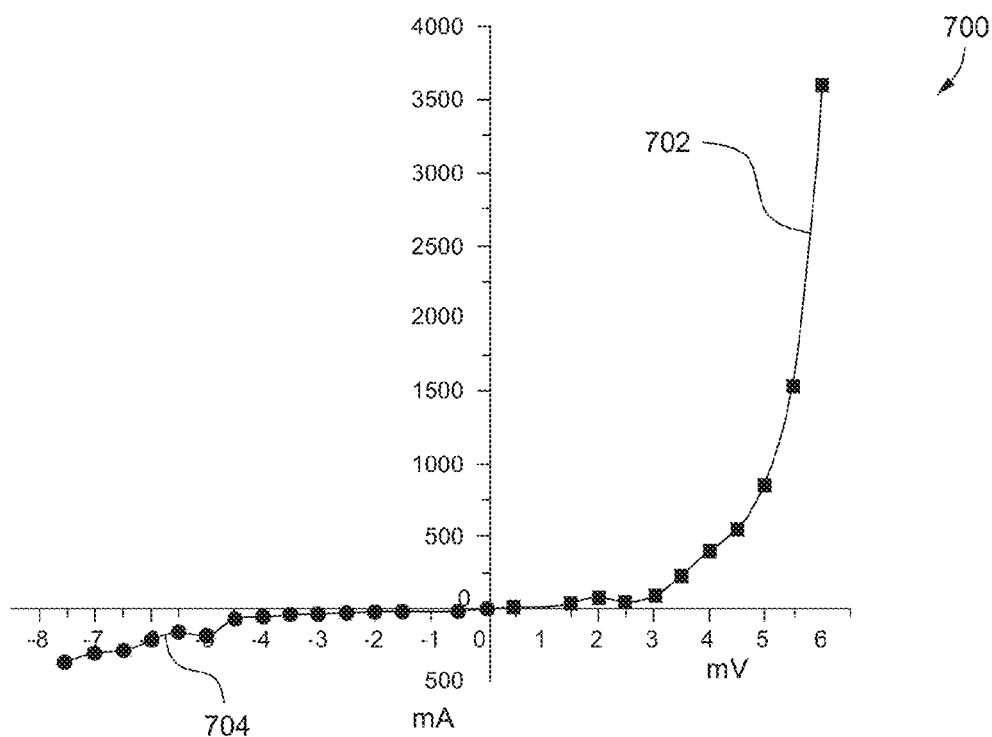
FIG. 7 is a graphical representation of current vs voltage characteristics of a photodiode.

FIG. 7 is a graphical representation 700 of current vs voltage characteristics of the photodiode of Example 5. The forward and reverse characteristics of the photodiode are represented by reference numerals 702 and 704 respectively. The characteristics of the photodiode using the MoS$_2$ sheets fabricated using the present technique were similar to that of a conventional Schotkky diode. As can be seen, there was a strong electric field in the active area and pure drift photocurrent was observed without any diffusion components.

Example 7: Fabrication of a Supercapacitor Using Exfoliated MoS$_2$ Sheets

A supercapacitor was fabricated using the MoS$_2$ sheets formed using the present technique. Here about 150 mg of chemically and thermally exfoliated MoS$_2$ sheets were dispersed in about 750 microliters ($\mu$l) of Nafion solution (commercially available from DuPont, India) by sonication with a sonication cycle of about 3 minutes per cycle. Further, two pieces of carbon cloth having an area of about 2 cm×2 cm were heated to a temperature of about 100° C. The solution of MoS$_2$ sheets and Nafion was sprayed/brush painted on the two carbon cloths, and the coated clothes were dried for about 5 minutes at a temperature of about 100° C. Moreover, about 3 grams of PVA was dissolved in about 100 ml of DI water and was dried in a petri dish to obtain a 3% PVA film. A stack of coated carbon cloth and PVA polymer film and another coated cloth was then formed to fabricate a MoS$_2$-PVA supercapacitor that was used for characterization and measurements.

Further, about 2 ml of 3% PVA solution and about 8 ml of 5 wt % dipotassium phosphate (K$_2$HPO$_4$) solution were mixed to form a hybrid solution. The above prepared stack of coated carbon cloth, PVA polymer and another coated cloth was immersed/soaked in this solution for about 5 minutes to 10 minutes, and was subsequently dried for about 5 minutes at a temperature of about 50° C. to form a MoS$_2$-PVA-electrolyte capacitor that was used for further characterization and measurements. It should be noted that the high conductivity of the MoS$_2$ sheets enabled the construction of the device and did not require metallic current collector electrodes used in commercial electrochemical capacitors thereby reducing the structural weight of the supercapacitor.

Example 7: Characterization of the Supercapacitors of Example 6

Here, three samples using pure MoS$_2$ sheets, MoS$_2$ sheets with PVA, and MoS$_2$ sheets with PVA and K$_2$HPO$_4$ respectively were prepared and used for characterization. Additional samples with different MoS$_2$ loadings such as 50 mg and 100 mg were also fabricated. The physical characteristics of fabricated devices using MoS$_2$ sheets with PVA, and MoS$_2$ sheets with PVA and K$_2$HPO$_4$ respectively are provided in Table 1:

TABLE 1

|  | MoS$_2$- PVA | MoS$_2$- PVA - K$_2$HPO$_4$ |
| --- | --- | --- |
| Effective Thickness | 20.3 μm | 30 μm |
| Electrolyte Thickness | 10 μm | 10 μm |
| Active Area | 4 cm$^2$ | 20 cm$^2$ |
| Device Thickness | 45.25 μm | 51.5 μm |
| Volume | 8.12 * 10$^{-3}$ cm$^3$ | 20.6 * 10$^{-3}$ cm$^3$ |
| Weight including Carbon Cloth | 0.295 gm | 0.3092 gm |
| Weight of Carbon Cloth | 0.2 gm | 0.2 gm |
| Weight of Active Materials | 0.095 gm | 0.1092 gm |

Figure 8:
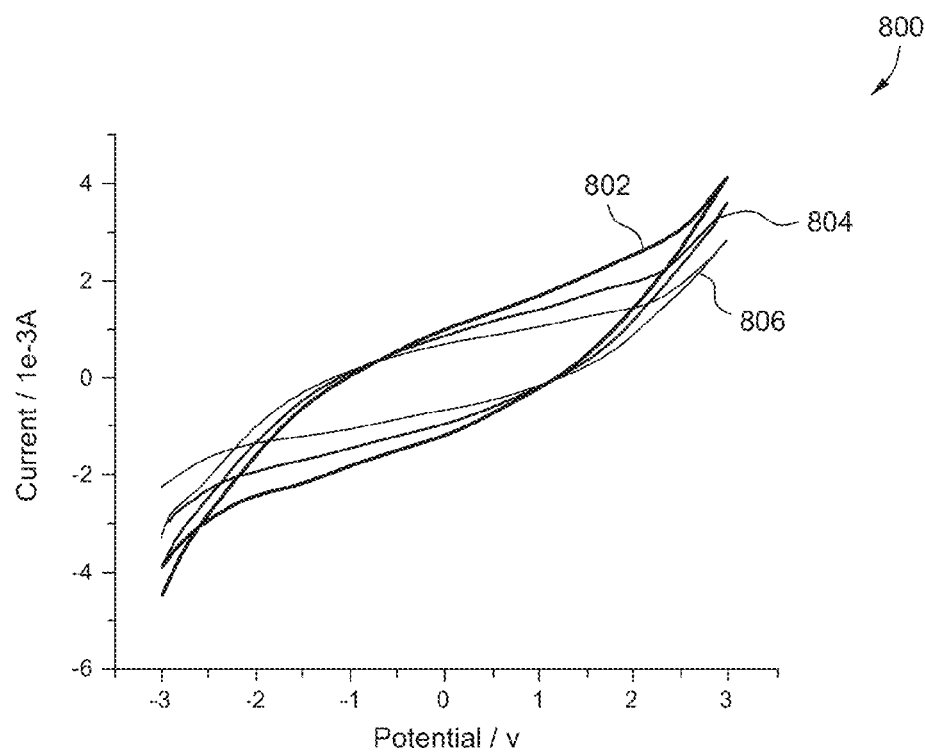
FIG. 8 is a graphical representation of cyclic voltammetry results for a $MoS_2$-PVA-$K_2HPO_4$ supercapacitor obtained at different scanning rates.

The performance of the supercapacitors using pure MoS$_2$ sheets, MoS$_2$ sheets with PVA, and MoS$_2$ sheets with PVA and K$_2$HPO$_4$ respectively were evaluated using cyclic voltammetry. FIG. 8 is a graphical representation of cyclic voltammetry results 800 for the MoS$_2$-PVA-K$_2$HPO$_4$ supercapacitor of Example 7 obtained at different scanning rates. Here, the potential of the working electrode was initially ramped linearly with time until it reached a set potential and then the potential ramp was inverted. The experiment was performed for different scan rates. The results for scan rates of 100 mV/S, 50 mV/S and 25 mV/S are represented by reference numerals 802, 804 and 806 respectively. As can be seen from the cyclic voltammetry plots the proposed supercapacitor showed a high potential for storing charge.

Figure 9:
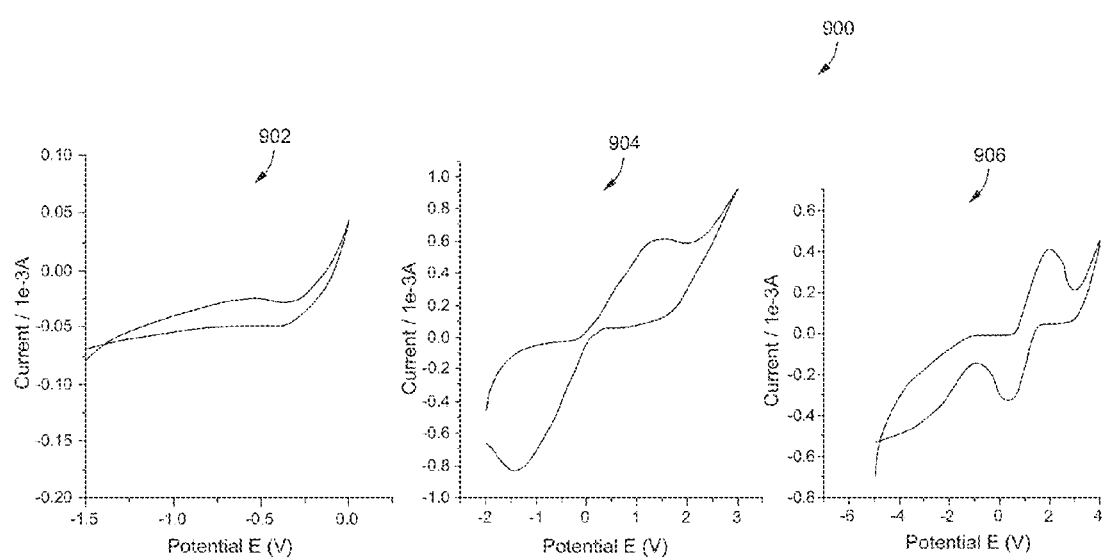
FIG. 9 is a graphical representation of the cyclic voltammetry study of a supercapacitor formed using different layers of electrodes and polymers.

FIG. 9 illustrates graphical representation of the cyclic voltammetry results 900 of the supercapacitor formed using different layers of electrolytes and polymers. Here, the results for the supercapacitors using pure MoS$_2$ sheets, MoS$_2$ sheets with PVA, and MoS$_2$ sheets with PVA and K$_2$HPO$_4$ are represented by reference numeral 902, 904 and 906 respectively. As can be seen from graph 902, the supercapacitor formed using pure MoS$_2$ sheets was observed with no redox potential. Moreover, as can be seen from the graph 904, the supercapacitor formed using MoS$_2$ sheets with PVA responded to a redox potential but bell curves were not observed. Further, as can be seen from the graph 906, the supercapacitor formed using MoS$_2$ sheets with PVA and K$_2$HPO$_4$ responded well to the redox potential and it clearly showed the emergence of bell curves.

Figure 10:
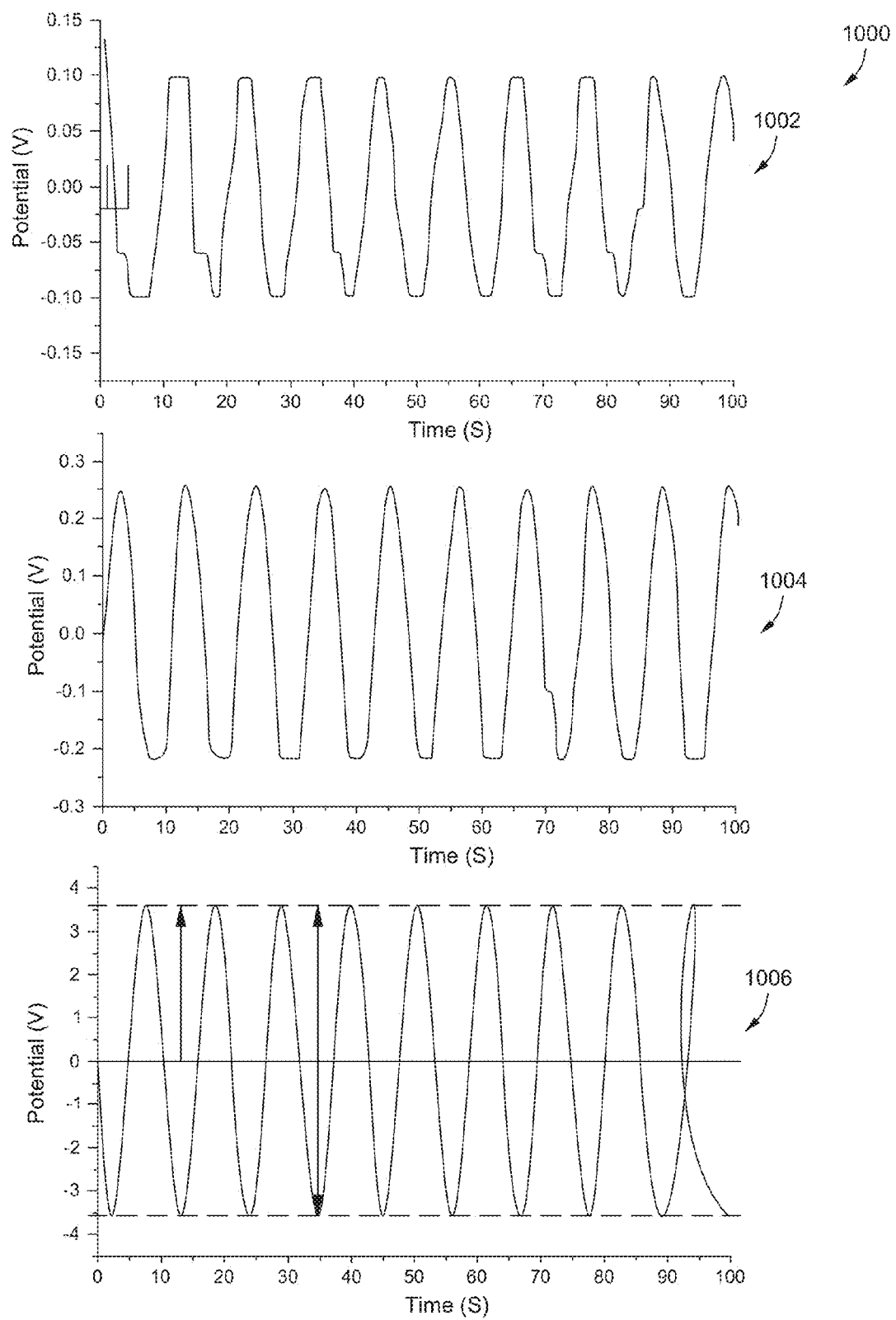
FIG. 10 illustrates example charge-discharge profiles of a supercapacitor formed using different layers of electrodes and polymers.

FIG. 10 illustrates example charge-discharge profiles 1000 of the supercapacitor formed using different layers of electrolytes and polymers. The curves 1002, 1004 and 1006 illustrate the charge-discharge characteristics for supercapacitors using pure MoS$_2$ sheets, MoS$_2$ sheets with PVA, and MoS$_2$ sheets with PVA and K$_2$HPO$_4$ respectively showing expanded operating voltages in the same order.

Figure 11:
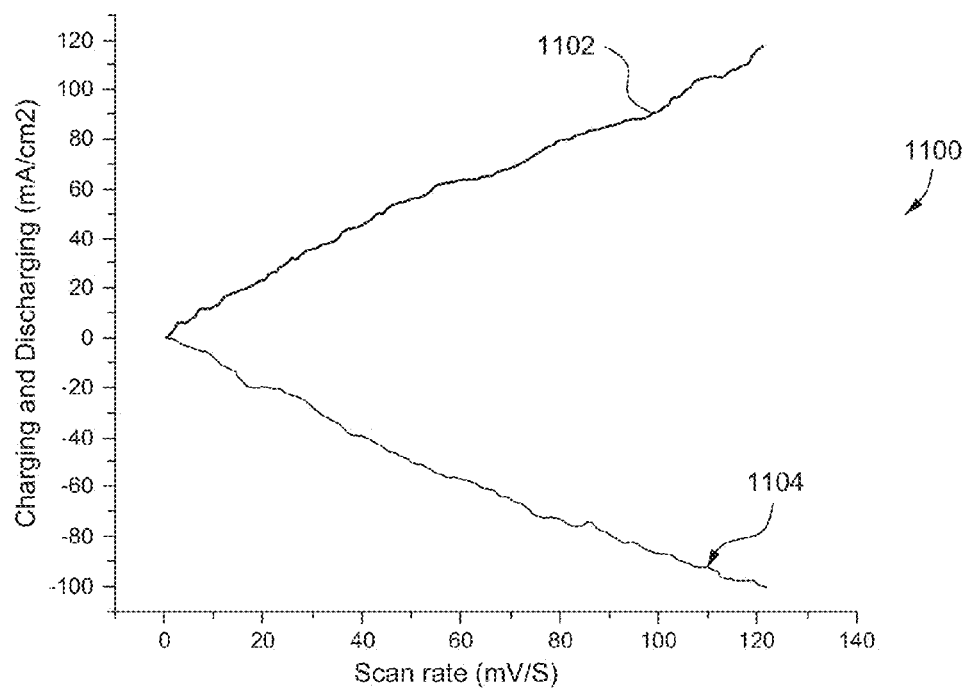
FIG. 11 illustrates example charge-discharge profiles of a supercapacitor at different scan rates.

FIG. 11 illustrates example charge-discharge profiles 1100 of the supercapacitor at different scan rates. The charging profile and the discharging profile of the supercapacitor for different values of the scan rate are represented by reference numeral 1102 and 1104 respectively. As can be seen, the charging and discharging profiles of the supercapacitor exhibit a linear variation with respect to the scan rate.

Figure 12:
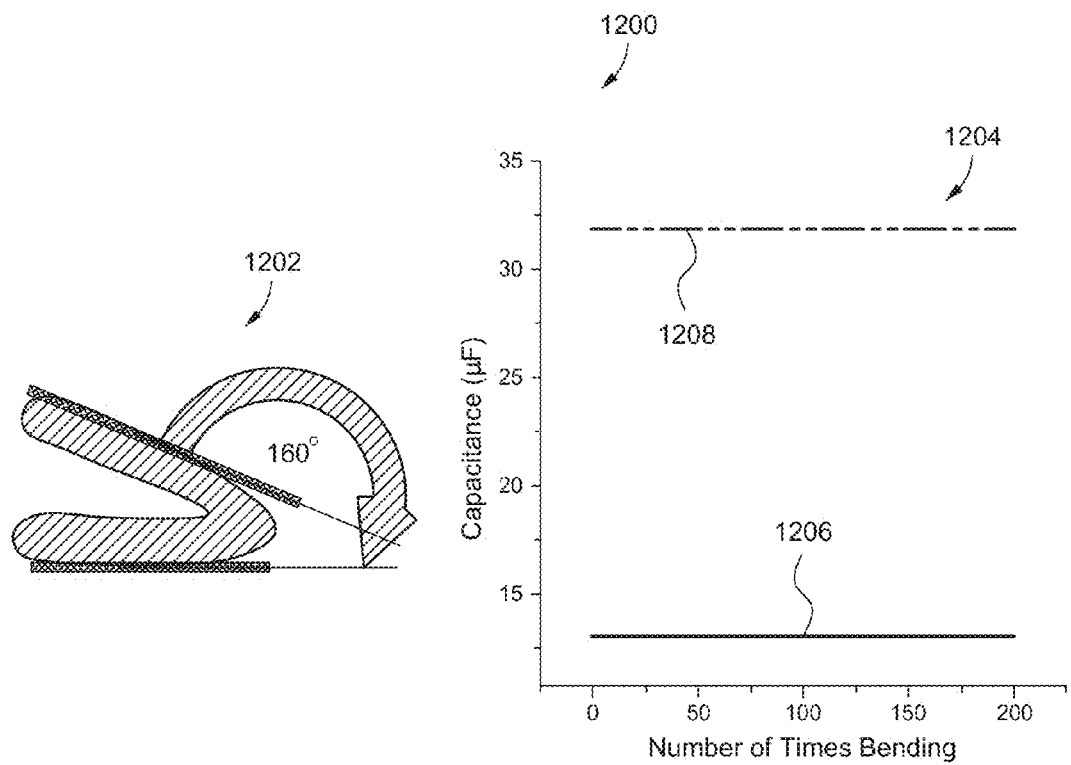
FIG. 12 illustrates characteristics of the supercapacitor under stress conditions.

FIG. 12 illustrates characteristics 1200 of the supercapacitor under stress conditions. An example configuration of the supercapacitor under stress with a bend angle is represented by reference numeral 1202. Here, The supercapacitor was observed to retain about 95% of the initial capacitance when tested under a bent state while applying a bend angle of about 160°. The change in capacitance value of the supercapacitor with different loadings of MoS$_2$ is represented by profile 1204. Here, the plots for supercapacitor having about 50 mg and 150 mg value of the MoS$_2$ loading respectively are represented by reference numerals 1206 and 1208. As can be seen, no change in capacitance value of the film was observed for different loadings of MoS$_2$ indicating that the device can be bent without any obvious decrease in performance compared to its planar state.

Performance parameters were estimated for the supercapacitors using MoS$_2$ sheets with PVA and K$_2$HPO$_4$ of Example 7 based on the values obtained from the charging-discharging profile of the supercapacitor. The capacitance of the supercapacitor was estimated using the following equation:

$$Q=C, C=i/(-dV/dt) \qquad (1)$$

Where, i is the current applied (in amps, A), dV/dt is the slope of the discharge curve (in volts per second, V/s).

For an applied current of 10 mA and dV/dt=5/7 as estimated from the profile 1006 of FIG. 10, the capacitance was estimated to be about 7.7 F. Further, specific capacitance was estimated based on the weight of the device stack in accordance with the following equation:

$$\text{Gravimetric stack capacitance}=C/M \qquad (2)$$

Where, M refers to the weight of the device.

The gravimetric capacitance of the supercapacitor was estimated using the weight of the device stack. This included the active material, the flexible substrate, the current collector and the separator with electrolyte. The specific capacitance of the supercapacitor including the weight of current collector carbon cloth was estimated to be about 24.91 F/gm and the specific capacitance of the supercapacitor excluding the weight of current collector carbon cloth was estimated to be about 70.64 F/gm.

The power density of the supercapacitor was estimated from the galvanostatic curves at different charge/discharge current densities using the equation:

$$P=V*I/M \qquad (3)$$

Where, P is the power (W/gm),

ΔE is the operating voltage window (measured in volts and obtained from the discharge curve) and M is the weight of the stack as indicated earlier (in gm).

The power density of the supercapacitor including the weight of current collector carbon cloth was estimated to be about 226.5 W/Kg and the power density of the supercapacitor excluding the weight of current collector carbon cloth was estimated to be 642.2 W/kg.

The energy density of the device was estimated using the following equation:

$$E_g = C \times (\Delta E)^2 / (2) \quad (4)$$

Where, $E_g$ is the energy density (Wh/kg),
C is the gravimetric stack capacitance obtained from Equation (2) (F/gm) and
$\Delta E$ is the operating voltage window (volts).
The energy density of the supercapacitor was estimated to be about 188.31 Wh/Kg.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B".

As will be understood by one skilled in the art, for any and all purposes, such as in terms of providing a written description, all ranges disclosed herein also encompass any and all possible sub ranges and combinations of sub ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc.

As will also be understood by one skilled in the art all language such as "up to," "at least," "greater than," "less than," and the like include the number recited and refer to ranges which can be subsequently broken down into sub ranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method of forming two-dimensional transition metal dichalcogenide sheets, the method comprising:
   adding a cross-linking agent to an activating agent to form a solution;
   mixing a two-dimensional transition metal dichalcogenide with the solution to form a mixture;
   adding a cleaving agent to the mixture;
   stirring the mixture comprising the cleaving agent to form one or more contiguous sheets of transition metal dichalcogenide;
   removing any particulate matter; and
   exfoliating the one or more contiguous sheets of transition metal dichalcogenide by exposing the one or more contiguous sheets of transition metal dichalcogenide to electromagnetic radiation to form a plurality of two-dimensional transition metal dichalcogenide sheets.

2. The method of claim 1, further comprising:
adding a solvent to the one or more contiguous sheets of transition metal dichalcogenide; and
sonicating to remove unreacted agents.

3. The method of claim 2, wherein adding the solvent comprises adding ethanol, methanol, isopropyl alcohol, or combinations thereof.

4. The method of claim 2, further comprising:
filtering the solvent and the one or more contiguous sheets of transition metal dichalcogenide to produce a filtrate; and heating the filtrate to a temperature of about 50° C. for about 10 minutes to separate the one or more contiguous sheets.

5. The method of claim 1, wherein exposing the one or more contiguous sheets of transition metal dichalcogenide to electromagnetic radiation comprises exposing the one or more contiguous sheets of transition metal dichalcogenide to thermal radiation, solar radiation, microwave radiation, or combinations thereof.

6. The method of claim 1, wherein exfoliating the one or more contiguous sheets of transition metal dichalcogenide comprises heating the one or more contiguous sheets of transition metal dichalcogenide sheets to a temperature of about 150° C. at a pressure of about 1 atmosphere to about 2 atmosphere.

7. The method of claim 1, wherein mixing the two-dimensional transition metal dichalcogenide comprises mixing molybdenum disulphide ($MoS_2$), tungsten disulphide ($WS_2$), titanium disulphide ($TiS_2$), tantalum (IV) sulphide ($TaS_2$), zirconium disulphide ($ZrS_2$), bismuth telluride ($Bi_2Te_3$), bismuth selenide ($Bi_2Se_3$), titanium nitride chloride (TiNCl), antimony telluride ($Sb_2Te_3$), melonite ($NiTe_2$), or combinations thereof.

8. The method of claim 1, wherein forming the two-dimensional transition metal dichalcogenide sheets comprises forming $MX_2$, where M is Mo, W, Bi, Sb, Ti, Pt, Nb, Ta, Ni, Zr, Hf, V, Ta, and Pd; and X is S, Se, Te, and NCl.

9. The method of claim 1, wherein adding the cross-linking agent comprises adding 1-ethyl-3-[3-dimethylaminopropyl]carbodiimide hydrochloride (EDC), cystamine ($C_{14}H_{12}N_2S_2 \cdot 2HCl$), N,N'-dicyclohexylcarbodiimide (DCC), 3,3'-dithiobis(sulfosuccinimidylpropionate) (DTSSP), tris(2-carboxyethyl) phosphine hydrochloride (TCEP-HCl), dithiothreitol (DTT), or combinations thereof.

10. The method of claim 1, wherein adding the activating agent comprises adding ammonia ($NH_3$), tetramethyl ammonium hydroxide (TMAH), or combinations thereof, at a pH of 6.8 to 7.1.

11. The method of claim 1, wherein adding the cleaving agent comprises adding N-hydroxysuccinimide (NHS), N-hydroxysulfosuccinimide (Sulfo-NHS), or combinations thereof.

12. The method of claim 1, wherein the stirring is carried out at a temperature of about 125° C. to about 200° C.

* * * * *

UNITED STATES PATENT AND TRADEMARK OFFICE
CERTIFICATE OF CORRECTION

PATENT NO. : 9,914,647 B2
APPLICATION NO. : 14/520358
DATED : March 13, 2018
INVENTOR(S) : Thevasahayam Page 1 of 1

It is certified that error appears in the above-identified patent and that said Letters Patent is hereby corrected as shown below:

In the Specification

In Column 7, Line 15, delete "carbodimide" and insert -- carbodiimide --, therefor.

In Column 11, Line 46, delete "recitation no" and insert -- recitation, no --, therefor.

In Column 12, Line 1, delete "general such" and insert -- general, such --, therefor.

In Column 12, Line 9, delete "general such" and insert -- general, such --, therefor.

In the Claims

In Column 14, Line 4, in Claim 7, delete "(TiNCI)" and insert -- (TiNCl) --, therefor.

In Column 14, Line 9, in Claim 8, delete "NCI." and insert -- NCl. --, therefor.

Signed and Sealed this
Twenty-ninth Day of May, 2018

Andrei Iancu
*Director of the United States Patent and Trademark Office*